United States Patent [19]
Hiniker et al.

[11] Patent Number: 4,942,765
[45] Date of Patent: Jul. 24, 1990

[54] ULTRASONIC VELOCITY SENSOR

[75] Inventors: Thomas K. Hiniker, N. Mankato; Semor D. Tofte, Mankato, both of Minn.

[73] Assignee: Micro-Trak Systems, Inc., Mankato, Minn.

[21] Appl. No.: 276,768

[22] Filed: Nov. 28, 1988

Related U.S. Application Data

[62] Division of Ser. No. 175,777, Mar. 31, 1988.

[51] Int. Cl.⁵ .............................................. G01L 19/14
[52] U.S. Cl. .......................................... 73/431; 73/493
[58] Field of Search ...................... 73/431, 866.5, 488, 73/493; 220/366, 378, DIG. 6; 174/17 VA, 52.1; 277/201, 202, 70, 71, 75; 367/89, 90, 91

[56] References Cited

U.S. PATENT DOCUMENTS 3,696,729 10/1972 Chabala et al. ............... 174/17 VA
4,728,954 3/1988 Phelan et al. ...................... 367/91

FOREIGN PATENT DOCUMENTS 2120853 12/1983 United Kingdom .......... 174/17 VA

Primary Examiner—Hezron E. Williams
Assistant Examiner—Louis M. Arana
Attorney, Agent, or Firm—Merchant, Gould, Smith, Edell, Welter & Schmidt

[57] ABSTRACT

An ultrasonic ground speed sensor has a single transducer which both transmits and receives ultrasonic signals. The sensor is mounted on a vehicle in alignment with the direction of the vehicle, the transducer having a built-in angle with the body of the sensor unit. The transmitted signal is clocked by a 16 MHz clock, with the signal received by the transducer selectively filtered and amplified. A temperature sensor is also used to determine the speed of the transmitted and received signal. A 64-cycle sample period is used, as well as multiple counters and a signal processor to increase accuracy and minimize erroneous readings. A drop-out detector and monitoring system sensor is also described. The vehicle speed is calculated from a Doppler-based formula as a function of both the sum and difference of the transmitted and received signal frequencies. Also disclosed is a gasket seal having leak holes for drainage from the interior of the sensor.

6 Claims, 12 Drawing Sheets

ULTRASONIC VELOCITY SENSOR

This is a division, of application Ser. No. 175,777, filed Mar. 31, 1988.

FIELD OF THE INVENTION

This invention relates to a sensor for sensing the velocity of an object, such as an agricultural vehicle, using an ultrasonic transducer.

BACKGROUND OF THE INVENTION

The speed sensors typically used for agricultural monitors and control systems fall into two categories: magnetic and radar. Magnetic sensors, typically mounted on the wheel or drive shaft of the agricultural vehicle, may produce inaccurate speed readings due to wheel slippage, wheel distortion and other factors. Radar sensors, while calculating the speed of the vehicle independently of wheel motion, do not discriminate between forward and reverse motion and are typically less accurate at slower speeds. Radar sensors may also produce measurement errors due to equipment vibration or signal interference caused by reflections from field debris or waving weeds. With respect to either magnetic or radar sensors, the incorrect speed readings which may arise can create significant errors in distance and area measurement, yield calculations and chemical application.

Doppler-based speed sensing systems are in use which determine velocity based on the received and transmitted frequency signals. For example, U.S. Pat. No. 4,728,954 discloses a Doppler-based speed sensor approximating ground velocity with the equation:

$$Vg + \frac{C(F(t) - F(r))}{2F(T)\cos(a)}$$

Where a is the angle of the signal transmission access from horizontal, C is the speed of sound, F(t) is the transmitted signal frequency, and F(r) is the received signal frequency.

Existing ultrasonic systems typically use multiple parts for transmitting and receiving the signal to be reflected. Existing system are also susceptible to inaccurate readings which arise from the change in the speed of sound due to changes in temperature and due to erroneous readings caused by ground interference and signal interference. Accuracy is also reduced by the approximate nature of the above-described equation. Finally, existing sensor outputs do not distinguish between forward and reverse vehicle directions.

SUMMARY OF THE INVENTION

An ultrasonic velocity sensor in accordance with the present invention comprises a single, electrostatic transducer alternately acting as a transmitter and a receiver. The sensor also includes circuit means for detecting, and minimizing the error caused by erroneous or missing pulses arising from ground debris or other effects. Also included are processing means for determining the frequency of the reflected signal and accurately calculating the sum and difference of the frequencies of the transmitted and reflected signals. Temperature sensing means are included for more accurate signal speed values, improving accuracy. Also included are output means for out-putting a Doppler-based velocity signal, indicative of ground speed and readable by a variety of commonly-used monitoring systems. The invention also comprises software means which feature the use of a 63%/37% duty cycle wave form that is inverted for the reverse direction. Thus, the direction as well as speed of travel may be determined from the sensor.

An ultrasonic velocity sensor as described above and disclosed herein provides greater accuracy in measuring ground velocity with an efficient number of circuit elements. Other features of the invention are discussed in greater detail herein.

DETAILED DESCRIPTION

Figure 1:
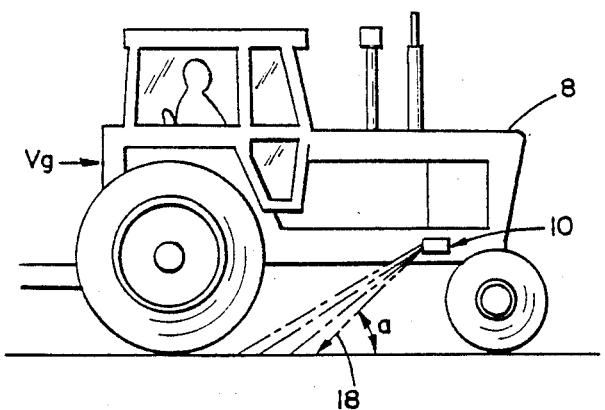
FIG. 1 is a simplified diagram of a speed system in accordance with the present invention as installed on an agricultural vehicle.

The speed sensing system in accordance with the present invention is shown as installed on an agricultural vehicle 8 in FIG. 1. The sensor 10 is installed such that its edges are parallel and perpendicular to the surface of the ground underneath the vehicle whose speed is to be sensed. The sensor 10 is built such that its transducer emits signals along a path 18 which is at an angle a with the ground of approximately 37°. The vehicle is moving at a velocity Vg.

Figure 2:
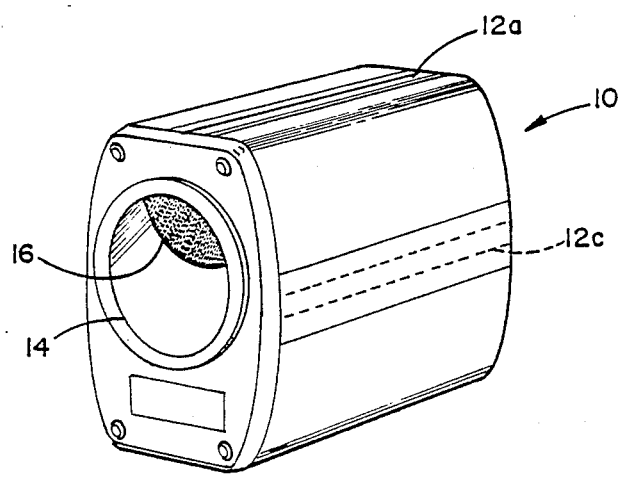
FIGS. 2 and 3 are a perspective and back elevational views of a speed sensor in accordance with the present invention.

FIG. 2 shows the speed sensing system 10 having a horn 14 for the transducer. The transducer surface 16 is visible within horn 14 and is set an angle with the sensor such that the transducer signal is emitted at the 37° angle when the sensor is mounted as described.

Figure 3:
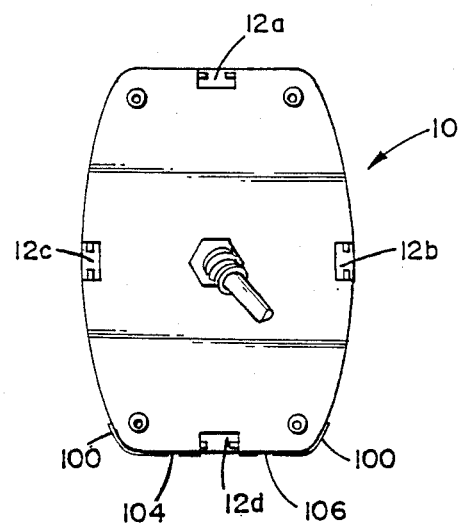

FIG. 3 shows the back of speed sensor 10 having mounting channels 12a, 12b, 12c, and 12d. These channels, which ar shown covered but are not covered when used for mounting, receive mounting nuts for receiving and for mounting the sensor on its sides, top, or bottom for ease of installation. Installation only requires that the sensor unit be mounted along a path parallel to the vehicle path, since the 37° angle is built into the unit. Also shown is a gasket seal, shown in part at 100, having leak holes 104, 108, for moisture to exit from the sensor unit.

Figure 4:
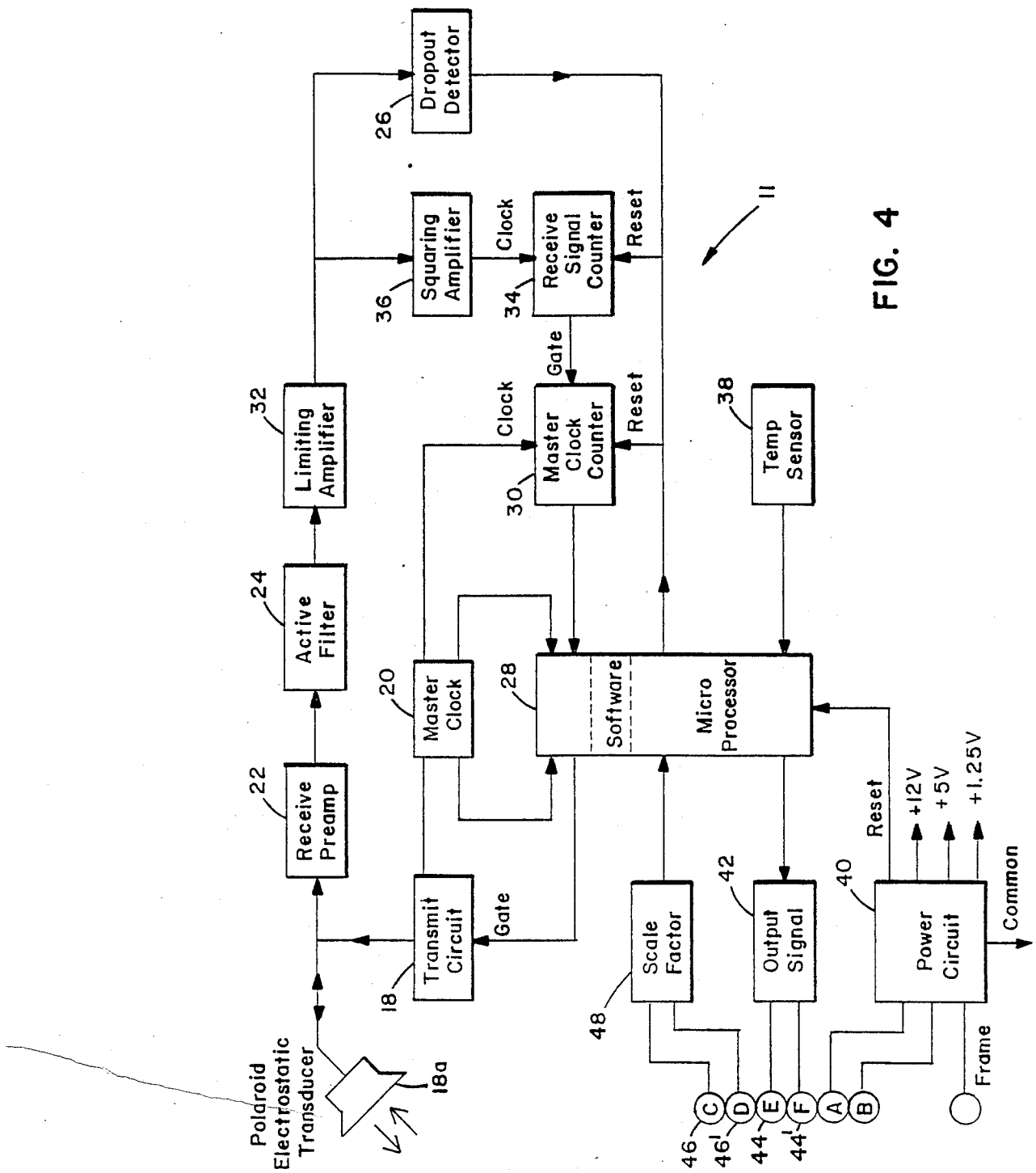
FIG. 4 is a schematic block diagram of the velocity sensor circuit of the present invention.

FIG. 4 is a block diagram of the speed sensing circuit 11 including an ultrasonic transmitting and receiving unit 18a incorporated in transducer or transmit circuit 18. This transmitting and receiving, or transducer circuit, utilizes a single transducer to both emit and receive the signal. The use of the single-transducer design reduces alignment and interference problems which may arise when separate transducers are used for emitting and receiving the signal. The use of the single transducer reduces the cost of the system and minimizes potential cross-talk problems between transmission and reception circuitry that may exist in circuits incorporating separate transmitters and receivers.

The signal emitted by the transducer is regulated by a master clock 20. Typically, master clock 20 will have a 16 megahertz signal divided down to obtain a 62.5 KHz transmission frequency. The 62.5 KHz frequency signal is supplied to the transducer circuit, which regulates the signal to supply 3.3 microsecond pulses at the frequency.

The transducer circuit 18 sends the received signal through a receive amplifier circuit 22 and active filter 24 which as described in more detail herein typically will include a pre-amplifier, band pass amplifiers, and a limiting amplifier 32 which reduces the gain for strong reflected signals. As shown, the band pass amplifier selectively amplifies signals in the range of approximately 53-72 KHz, the frequencies expected to be received during normal operation of an agricultural vehicle.

Squaring Amplifier 36 squares the output from the Limiting Amplifier 32 in a manner suitable for counting at receive signal counter 34. The circuit also includes threshold detector 26. This circuit drops signal pulses which fall below predetermined levels. Counter 34 remains in use so long as the drop-out period does not last longer than a selected time out period, 27 microseconds in the embodiment described. If the drop out period is longer than 27 microseconds, the counting process is aborted and automatically restarted. This system provides a further means for eliminating erroneous readings from the system.

Because the speed signal measurement system of the present invention calculates speed based on the difference as well as the sum of the transmitted and reflected frequencies, accurate measurements of these frequencies are required. Counter 34 counts the cycles of the received signal, while master clock counter 30 counts cycles from the master clock 20 proportionate to the transmitted signal. When using a circuit as described and shown in more particularity below, a measurement resolution of approximately 0.03 mph may be obtained. Synchronizing signals are employed and coordinated between all counters for precise synchronization by circuitry including microprocessor 28.

The power circuit 40 is typically designed for 12 volt battery operation. The power input circuitry, as described in more detail below, provides for rectification of the power input signal, filtering of power supply line noise, over-voltage protection, and energy storage to maintain operation during brown-outs.

The microprocessor 28 is software-controlled. The processor processes inputs from the counters as well as the temperature sensor 38 to generate a signal representative of the agricultural vehicle's velocity. The system uses an equation based both on the sum and the difference of the transmitted and received signals, as shown below:

$$Vg = \frac{C(F(t) - F(r))}{(F(t) + F(r))\cos(a)}$$

In this equation, C is the speed of sound, calculated from the temperature sensed at the temperature sensor 38 and stored data. The cosine of a is approximately 0.79 when a=37°. The signal generated by the signal processor is sent to the speed output signal circuit 42 which includes an opto isolator to avoid potential ground loops or signal ground currents, and having two signal output terminals 44, 44'.

Output terminals 44 and 44' (E and F) may be connected to a monitoring system (not shown) which may be any of a variety of systems currently available, or other systems. The scale factor circuit 48 senses the external circuit created by the adapter cable corresponding to a particular monitoring system across inputs 46 and 46'. The signal processor 28, under software control, receives a signal indicative of the external circuit and determines which, if any, of a variety of known monitoring systems is connected to the speed output. The processor adjusts the output signal supplied to circuit 42 in accordance with the type of monitoring system connected.

Figure 5:
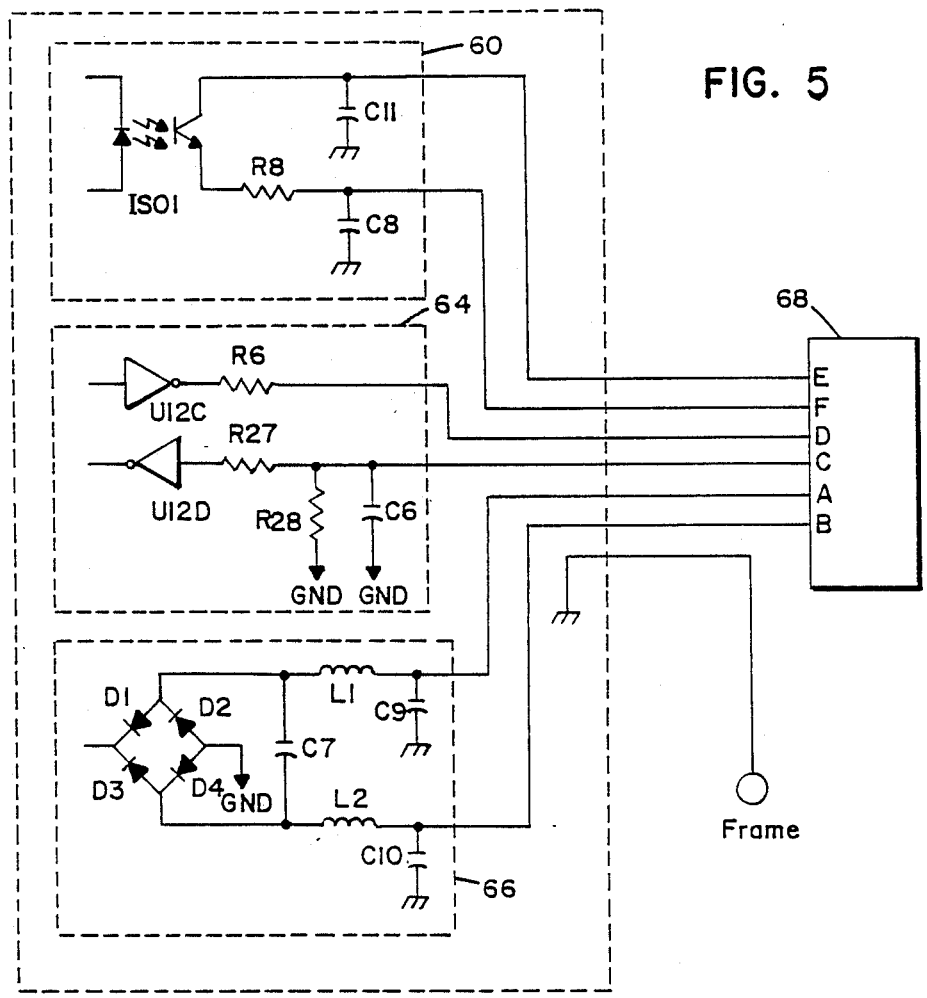
FIGS. 5, 6, 6A, 6B, 6C, and 6D are detailed circuit diagrams of a speed sensing system.

FIG. 5 shows a detailed schematic diagram of the output/input circuitry of the speed sensor. A portion of the opto isolator circuit for the velocity output is shown at isolator circuit 60. The output from this circuit is connected to an electrical connector interface 68 for output to any of a number of standard monitoring systems. In order to provide the proper signal for these different monitoring systems, the electrical connector interface 68 also provides for input connectors C, D which are either open-circuited, short-circuited, or have measurable resistances or a measurable voltage connected across the inputs. The inputs C, D are connected through monitoring system sensing circuit, shown in part at 64, to the speed signal sensing circuitry 11. Power is supplied at electrical connector interface inputs A, B through a power rectifying and filtering circuit shown in part at 66 to the rest of the speed signal sensing circuitry.

Figure 6:
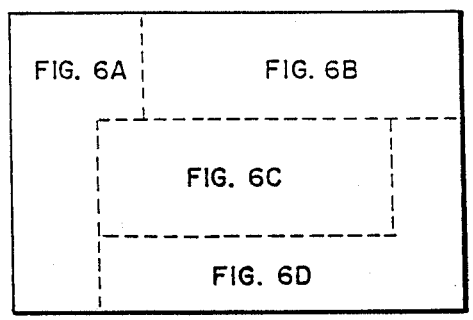
Figure 6A:
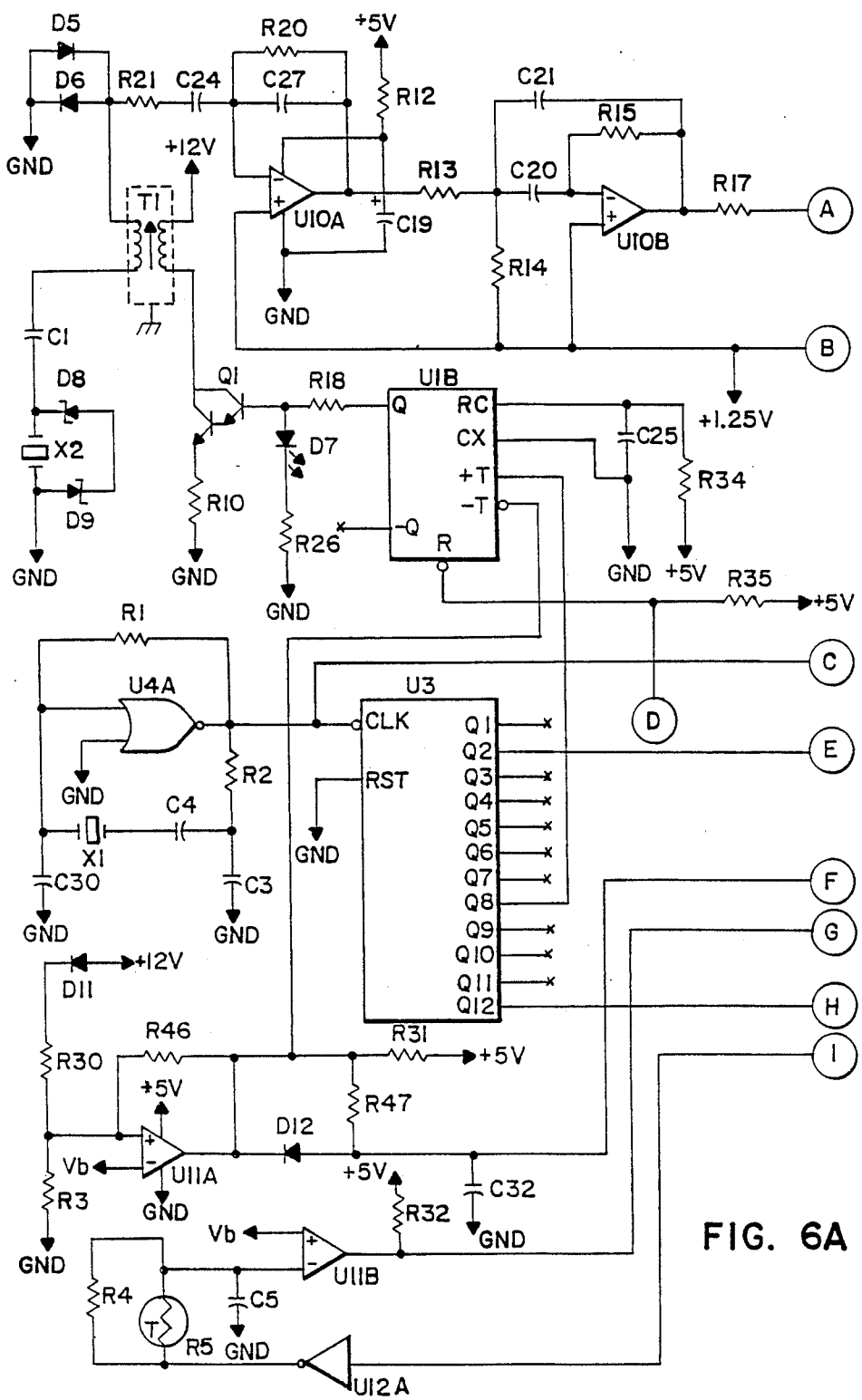

FIGS. 6A, 6B, 6C, and 6D are detailed circuit schematics for the speed signal circuit. The interconnection of these figures is shown in FIG. 6. The transducer circuit is indicated by transducer X2 rectified by zener diodes D8 and D9 (FIG. 6A). The signal outputted by the transducer is also further regulated and rectified by transformer T1, and diodes D5 and D6. The preferred circuit element model numbers are shown in the figures. The master clock is represented by a 16 MHz crystal X1 generating a clock signal in cooperation with capacitors C3, C4, and C30, as well as OR circuit U4A and resistors R1 and R2.

Mono-stable multivibrator U1B, in cooperation with resistors R18, R26 and R34, as well as capacitor C25 and diode D7, is enabled by signal processor U2 and triggered by divider circuit U3 to supply 3.3 microsecond pulses at the 62.5 KHz transmission frequency to the base of transistor circuit Q1. The mono-stable multivibrator circuitry establishes a temperature-compensated charging current to the transistor Q1.

Transformer T1 is a step-up transformer tuned to resonate with transducer X2 at the 62.5 KHz transmission frequency. Rectifying diodes D8 and D9 rectify the AC signal supplied to the transducer to provide the required DC bias to the transducer and ensure that the voltage across the transducer stays below a maximum voltage, in this case 320 volts. Diodes D5 and D6 provide a low impedance path for the transmitting signal in a high impedance load for the receiving signal.

Figure 6B:
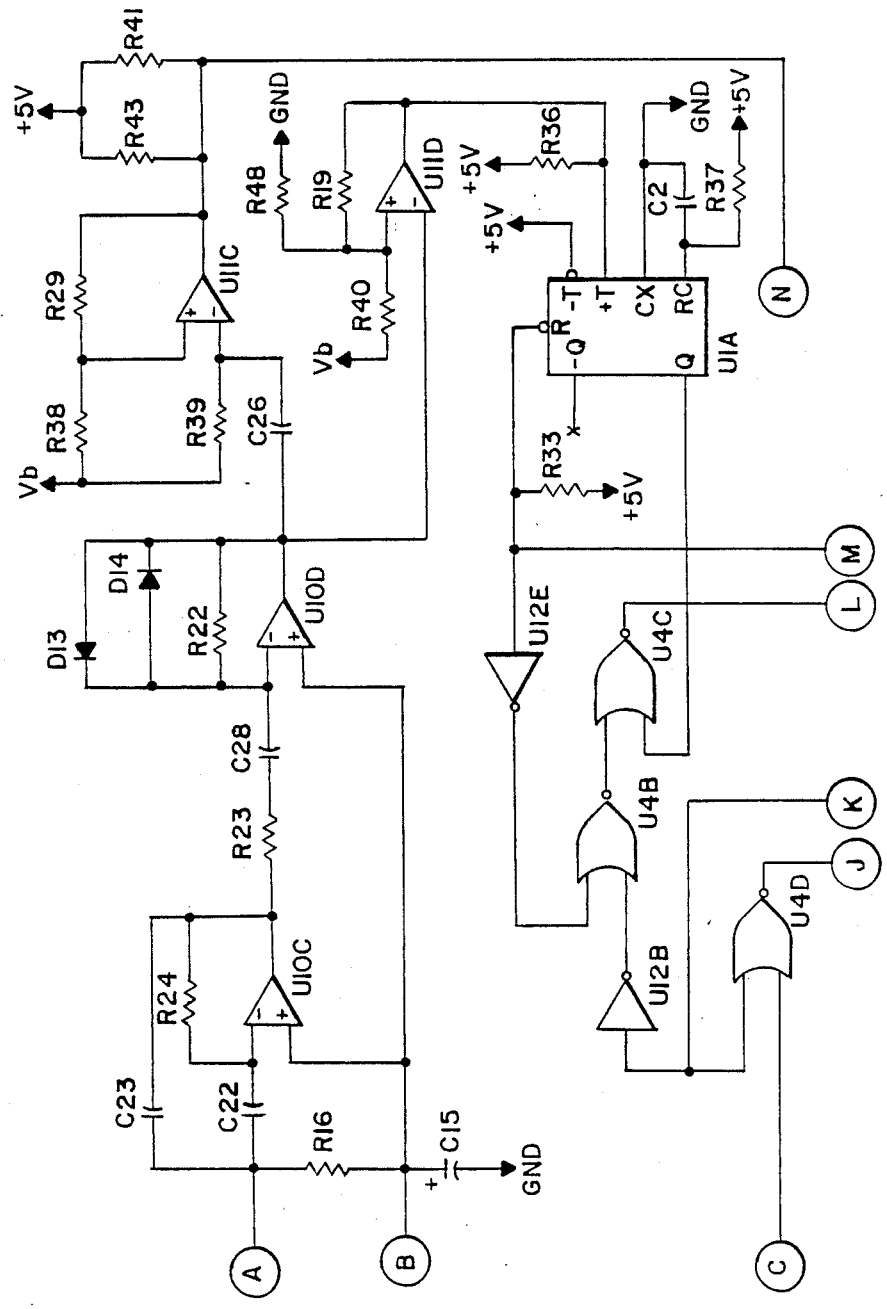

The signal received by the transducer and rectified by diodes D5 and D6 is received by the preamplifier circuit U10A in conjunction with capacitors C24 and C27 and resistors R20 and R21. The output from this pre-amplifier circuit passes to band pass filters U10B and U10C. Filter U10B is operated in conjunction with resistors R13, R14 and R15 and capacitors C20 and C21. The output signal is routed to the circuit of amplifier U10C, which includes capacitors C22 and C23 and resistors R16, R17 and R24 (FIG. 6B). The output from the second band pass amplifier is routed to limiting amplifier U10D, operating in conjunction with capacitor C28, resistors R22 and R23, and diodes D13 and D14. This limiting amplifier has reduced gain for strong reflected signals. The band pass amplifiers selectively amplify signals in the range of approximately 53-72 KHz. The combined amplifier circuits U10A-U10D further operate in conjunction with power supply filter circuit elements including capacitors C15 and C19 and resistor R12.

Circuit element U11C, in conjunction with resistors R29, R38, R39, R41, R43, and C26, is a squaring amplifier with hysteresis. The output from this amplifier is fed to the clock input of clock U6B, corresponding to counter 34 in FIG. 3. The output of limiting amplifier U10D is also fed to signal threshold detector U11D, operating in conjunction with resistors R19, R40 and R48. If the signal received at the dropout detector falls below the pre-set level, as determined by the resistors, some signal pulses will be dropped at the output of U11D.

U11D, in conjunction with resistor R36 and reset resistor R33, feeds mono-stable multivibrator U1A, which, in conjunction with resistor R37 and capacitor C2, detects missing pulses from the output of U11D. The output of this mono-stale multivibrator U1A will remain high so long as the trigger pulses from U11D are received within 27 microseconds of each other. If this requirement is not met, U1A's output goes low and the current counting process is aborted and automatically restarted.

Figure 6C:
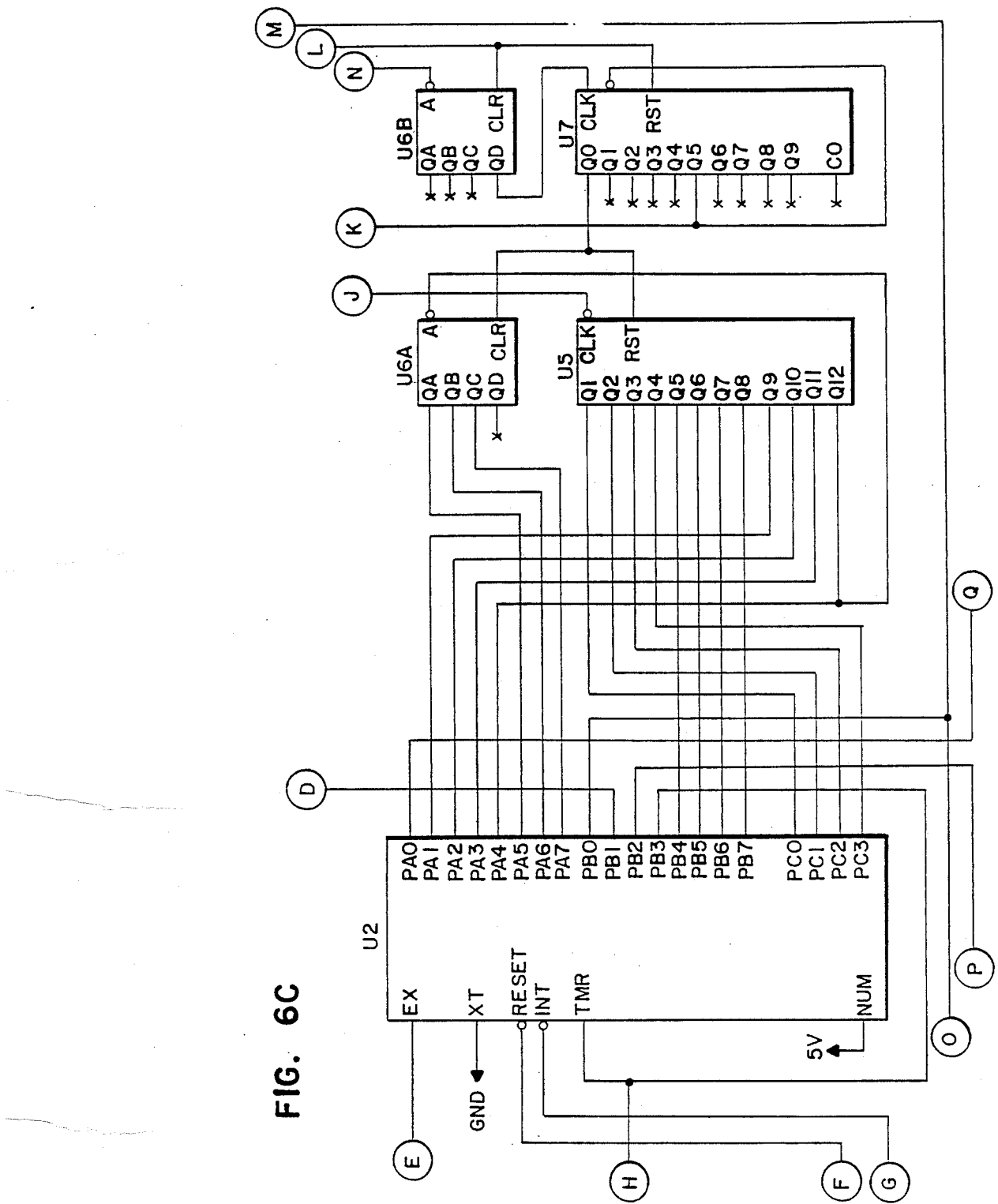

Small shifts in the reflected signal frequency are accurately measured through the use of two sets of counters. The first set of counters, U6B and U7, count the cycles of the received signal, while counters U6A and U5 count cycles from the 16 MHz master clock (FIG. 6C). To precisely synchronize all counters, the first set of counters U6B and U7 count 16 cycles of the received signal before the second set of counters U6A and U5 are enabled. The second set of counters are disabled exactly 64 received cycles later, with their count values provided to processor U2. Logic gates U4B, U4C, U4D, U12B and U12E coordinate the gating and resetting of all counters (FIG. 6B).

Figure 6D:
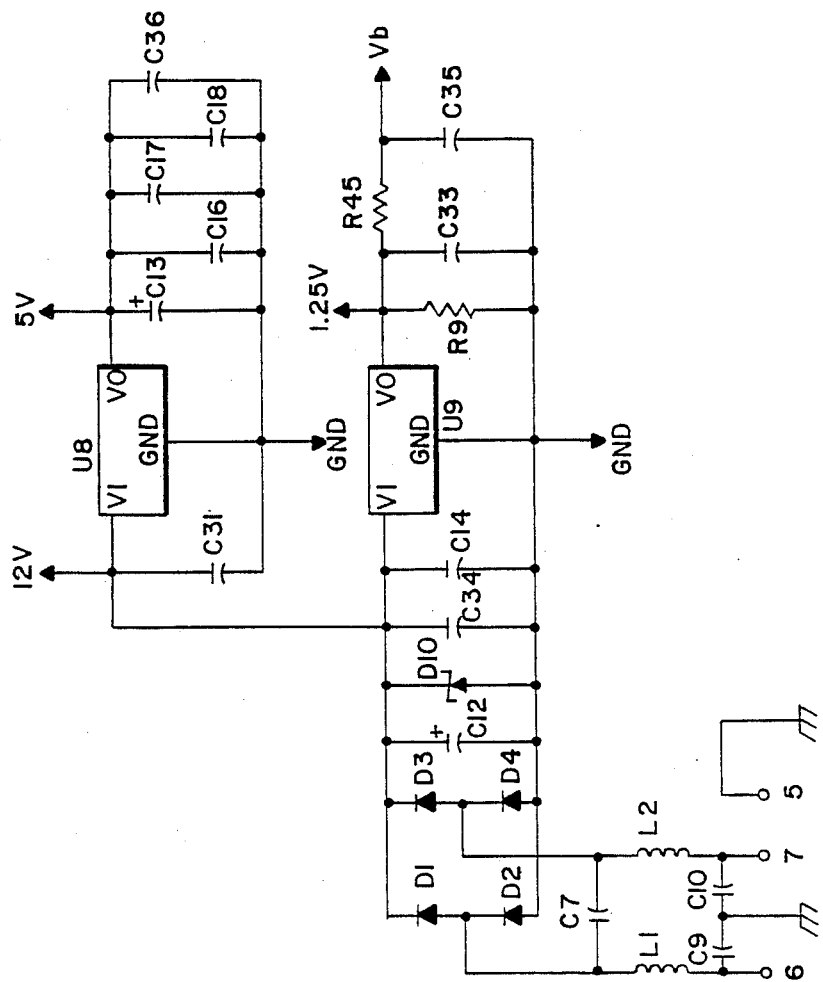
Figure 6D:
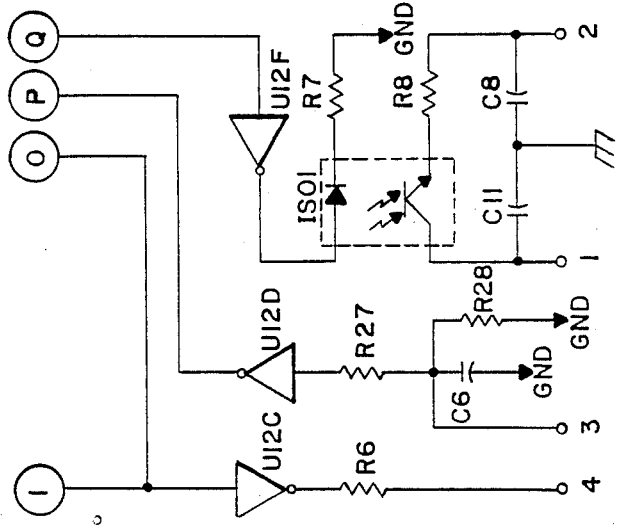
Figure 7A:
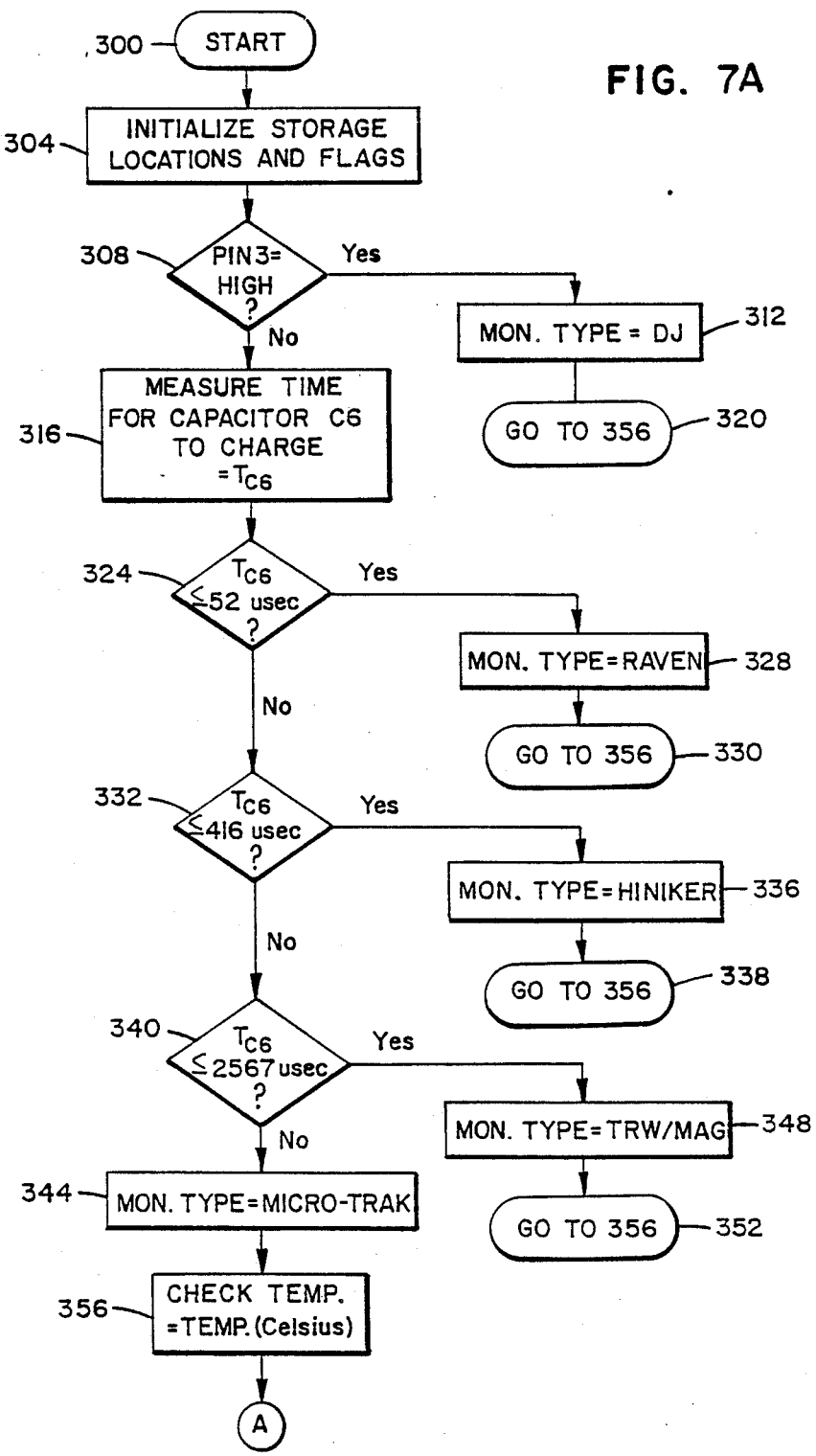
FIGS. 7A through 7E are flowcharts describing the operation of the software-controlled speed sensing system.
Figure 7B:
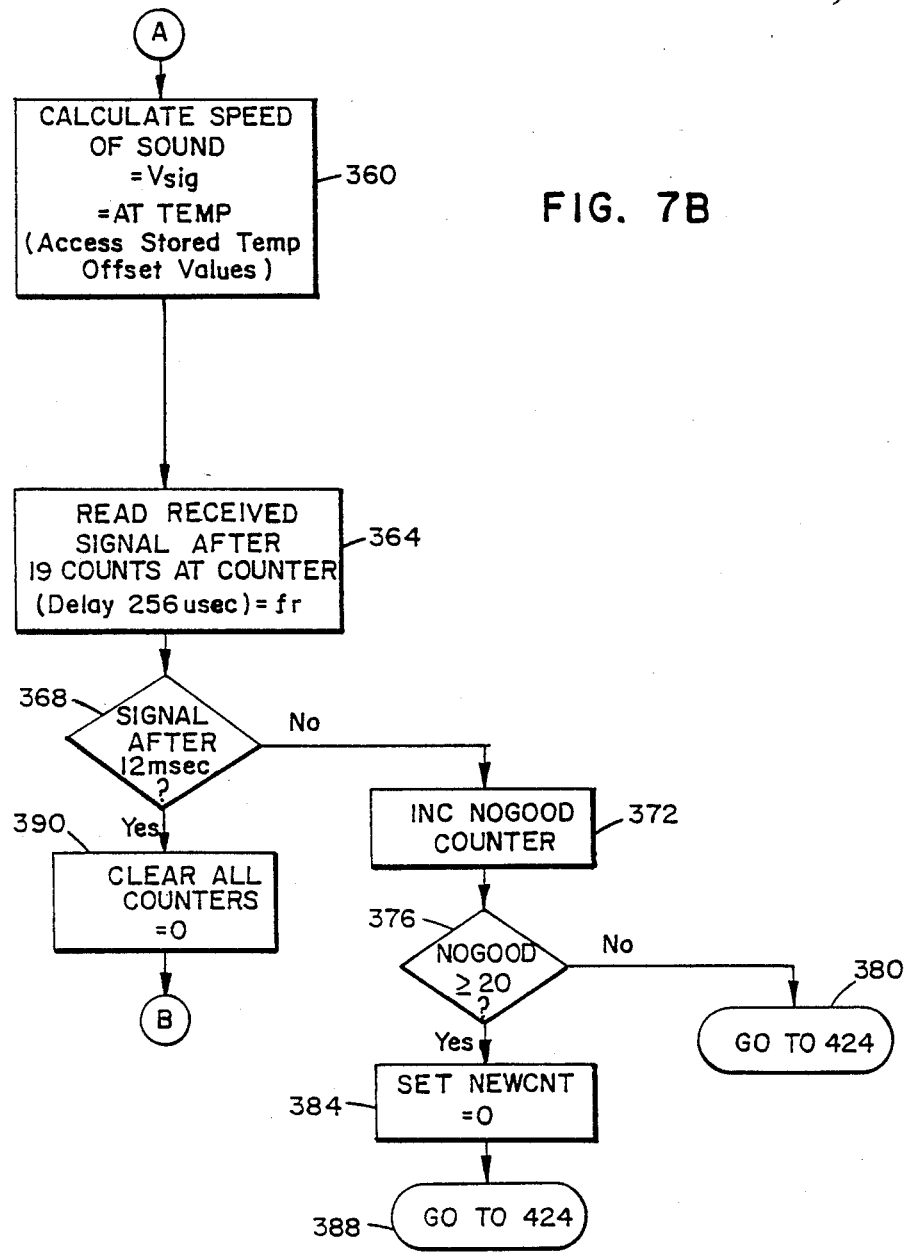
Figure 7C:
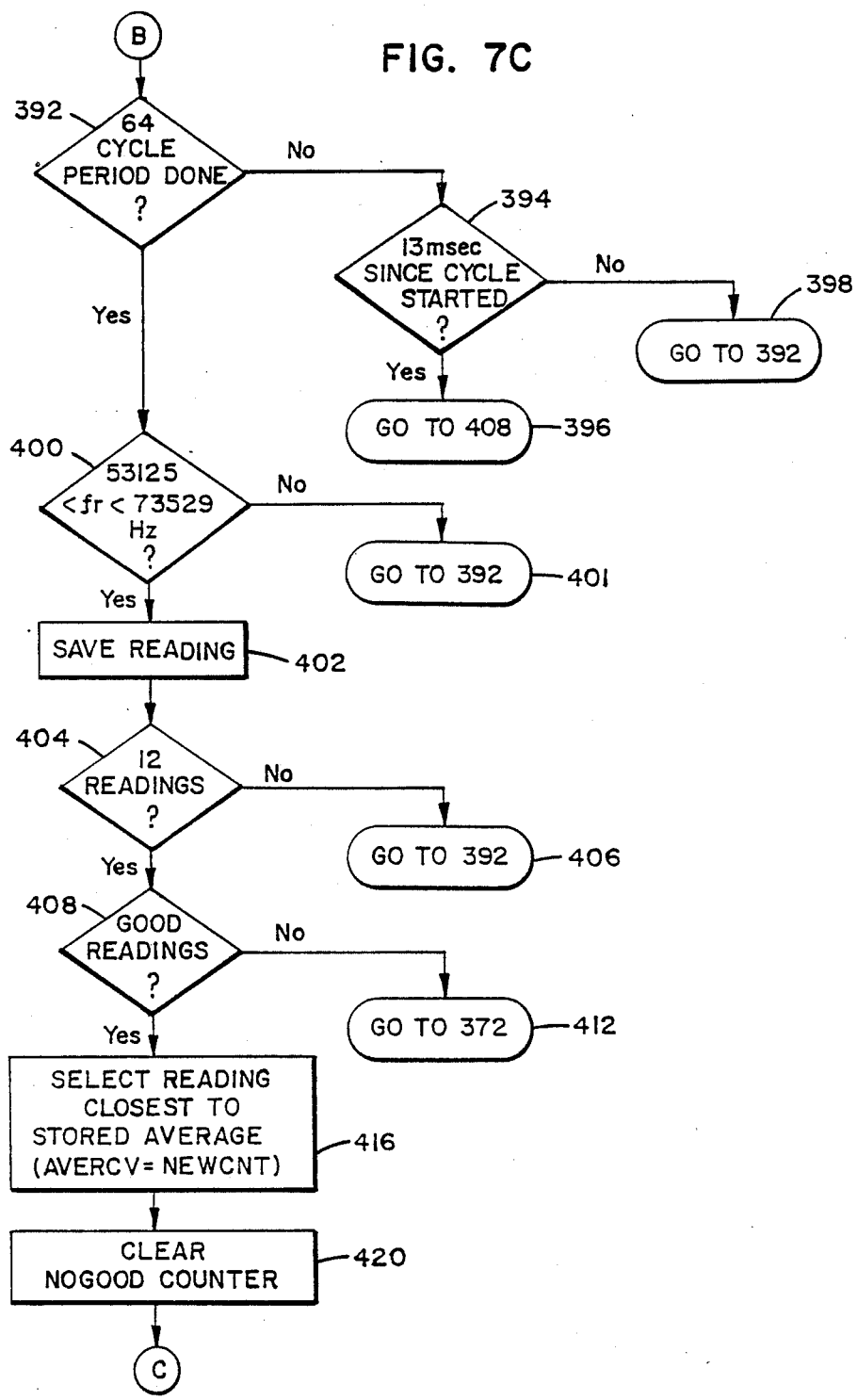
Figure 7D:
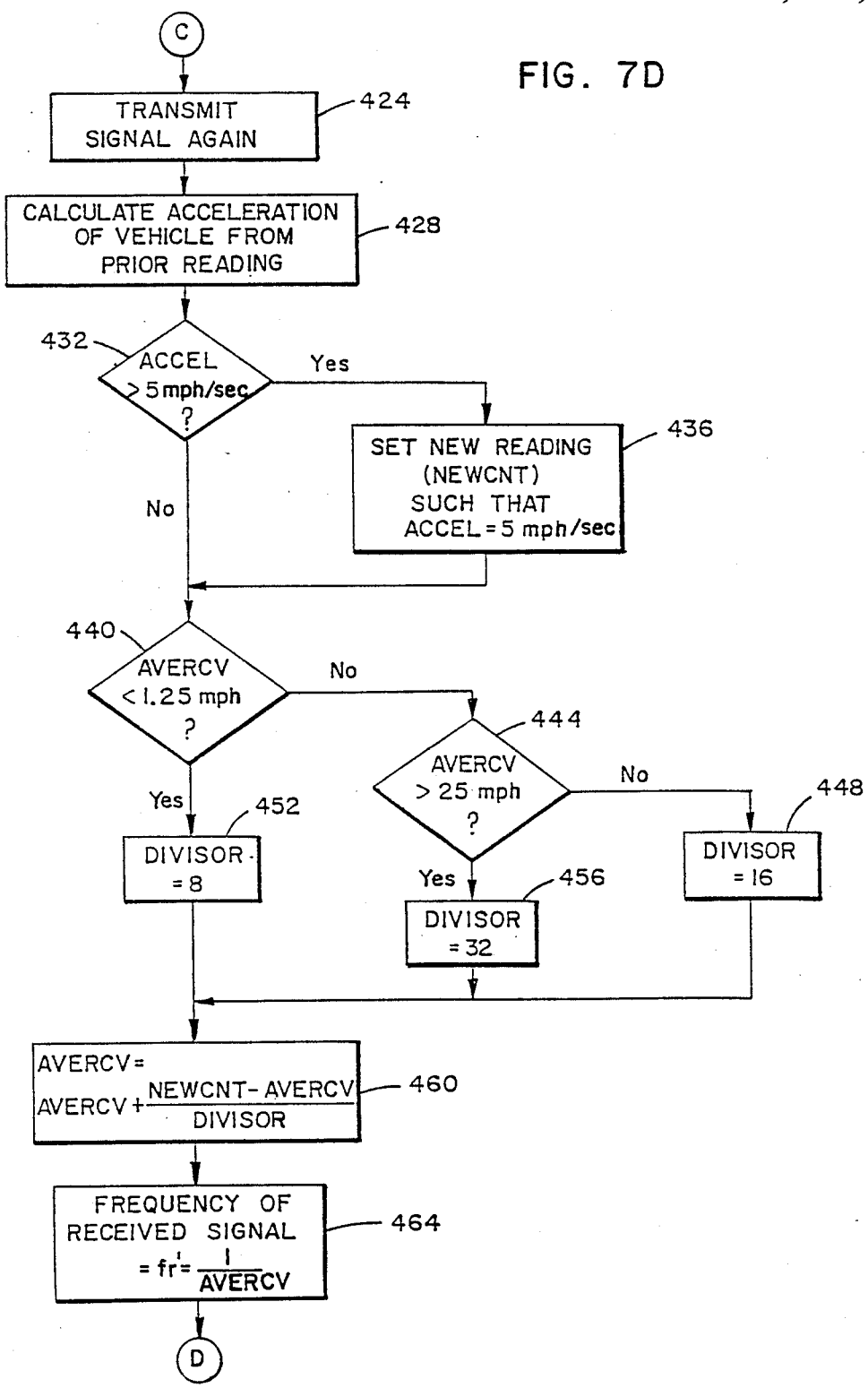
Figure 7E:
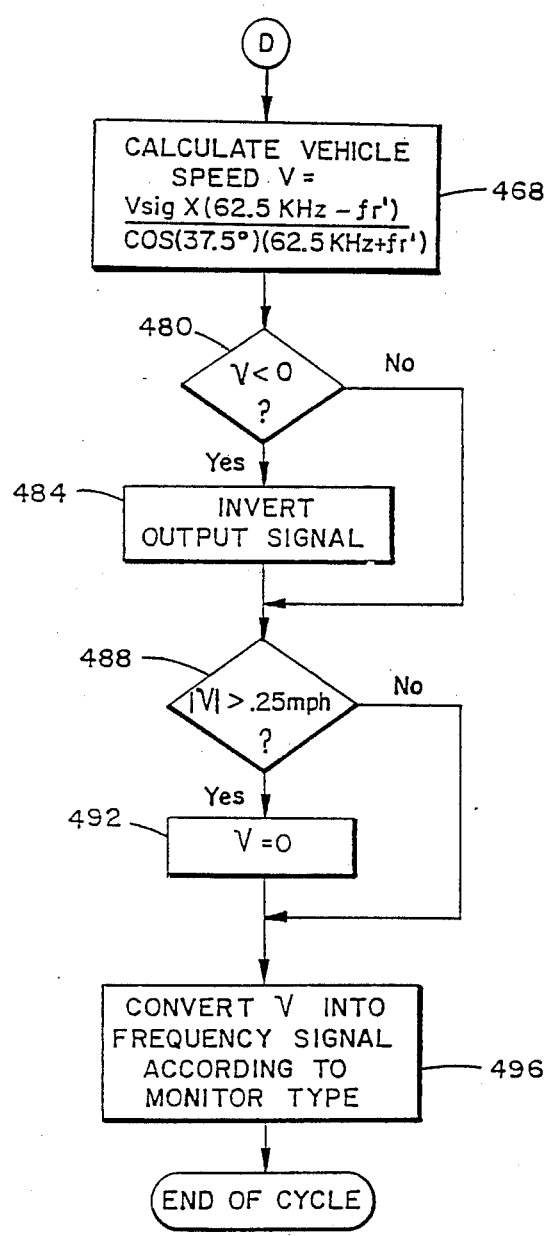

The system receives power at inputs 7 and 8 (FIG. 6D). The input signal, typically 12 volts, is rectified by diodes D1-D4 and filtered by capacitors C7, C9, C10 and inductors L1 and L2. Over-voltage protection is provided by diode D10. Energy is stored at capacitor C12 to allow for continuous operation during brown-outs. Regulator U8, in conjunction with capacitors C13, C16, C17, C18, C31, and C36, provides the main regulator. Regulator U9, in conjunction with capacitors C14, C33, C34, and C36 and resistor R45, provides the bias supply for all linear circuitry, as well as local filtering.

The signal indicative of the vehicle's speed is output from the signal processor U2 (FIG. 6C). This output signal is buffered by inverter U12F, which has adequate current capability to operate optical isolator ISO1. ISO1, in conjunction with capacitors C8 and C11 and resistors R7 and R8, limits external short circuit currents and suppresses noise spikes. The signal output is provided at output terminals 1 and 2.

Monitor interface terminals 3 and 4 enable the interfacing with a variety of popular monitoring systems used in agriculture. The signal processor U2, through inverters U12C and U12D and resistors R6, R27, and R28 and capacitor C6, senses the external circuit load represented by the monitoring system. When the speed sensor circuit is activated, the microprocessor determines whether the circuit across pins 3 and 4 constitutes an open circuit, a short circuit, a 12 volt power source, a 3 K ohm resistance, or a 20 K ohm resistance. Based on these determinations, indications of which are stored at signal processor U2, the system determined the type of monitoring device connected to the speed sensor and the equivalent scale for the speed sensor output according to the table below:

TABLE A

| Circuit across pins 3 and 4 | Brand of Monitor | Output Scale (hertz/mph) |
|---|---|---|
| Open | Micro-Trak | 5.028 |
| 12 volts | Dickey-john | 44.7 |
| Short | Raven | .5285 |
| 3 K ohms | Hiniker | 2.514 |
| 20 K ohms | TRW/Magnavox | 57.4 |

This determination is made and stored by signal processor U2.

The air temperature is checked fairly frequently over short sample periods. Temperature sensor T, including resistor R5, in conjunction with inverter U12A, resistor R4, capacitor C5, comparator U11B, and resistor R32 indicates temperature according to the amount of time required to charge capacitor C5 (FIG. 6A). This value is stored at signal processor U2.

Power is supplied across pins 6 and 7 (FIG. 6D). The power supply of voltage is monitored such that the signal processor is reset when the monitored voltage, as measured across capacitor C12, falls below approximately eight volts. This monitoring system includes comparator U11A in conjunction with resistors R30, R31, R3, R46, and R47, capacitor C32, and diodes D11 and D12 (FIG. 6A).

Suggested component values for the circuit shown in FIGS. 6A, 6B, 6C, and 6D are listed in the following tables:

TABLE B

| Capacitor | Capacitance |
|---|---|
| C1 | .022 MF |
| C2 | .0027 MF |
| C3,C24,C25 | 330 pF |
| C4 | 33 pF |
| C5,C6,C7,C14,C16,C17,C18,C26 C31,C32,C33,C34,C35,C36 | .1 MF |
| C8,C9,C10,C11 | .0033 MF |
| C12 | 3300 MF |
| C13 | 330 MF |
| C15,C19 | 6.8 MF |
| C20,C21,C22,C23,C28 | .001 MF |
| C27 | 27 pF |
| C30 | 18 pF |

TABLE C

| Resistor | Resistance (ohms) |
|---|---|
| R1 | 10 M |
| R2 | 1K |
| R3 | 20K |
| R4 | 86.6K |
| R5 | 50K |
| R6,R26, | 430 |
| R7,R45 | 200 |
| R8,R12 | 100 |
| R9 | 240 |
| R10 | 3.0 |
| R13 | 2.37K |
| R14 | 261 |
| R15,R22 | 23.7K |
| R16 | 309 |
| R17 | 2.74K |
| R18 | 620 |

TABLE C-continued

| Resistor | Resistance (ohms) |
| --- | --- |
| R19 | 51K |
| R20 | 91K |
| R21 | 8.2K |
| R23 | 2K |
| R24 | 27.4K |
| R27,R31,R32,R33,R34,R36,R37,R38,R39,R40,R41,R43 | 10K |
| R28 | 470K |
| R29 | 1 M |
| R30 | 100K |
| R46 | 200K |
| R48 | 75K |

TABLE D

| Inductor | Inductance |
| --- | --- |
| L1,L2 | 3.9 uH |

TABLE E
COMPONENT DESIGNATIONS

| Component Designation | Component Number |
| --- | --- |
| D1,D2,D3,D4,D11 | 1N4004 |
| D5,D6,D12,D13,D14 | 1N4148 |
| D7 | RED LED |
| D8,D9 | ZENER 1N990B |
| D10 | ZENER 1N6278A |
| U1A,U1B | 74HC4538 |
| U2 | MC68705P3S |
| U3,U5 | 74HC4040 |
| U4A,U4B,U4C,U4D | 74HC02 |
| U6A,U6B | 74HC393 |
| U7 | 74HC4017 |
| U8 | LM2931 |
| U9 | LM317LZ |
| U10A,U10B,U10C,U10D | MC33074 |
| U11A,U11B,U11C,U11D | LM2901 |
| U12A,U12B,U12C,U12D,U12E,U12f | 74HC04 |
| Q1 | 2N6724 |

The flow chart at FIGS. 7A–7E describes the performance of the software which enables the speed sensing circuit of the present invention. After memory storage locations and flags are initialized 304, the type of monitoring system connected to the speed sensing circuit is determined. If the monitoring system has a voltage potential applied to input pin 3, as for a Dickey-john monitor, the circuit will detect such a potential as a high signal at pin 3 and store an indication of such a voltage potential at the appropriate storage location 308, 312. For the resistances of other typical monitoring systems, which are listed in a Table in a preceding section of this specification, the system detects the difference between the monitoring systems in the form of the time it takes to charge capacitor C6 316. The processor determines which monitor type corresponds to the amount of time taken to charge capacitor C6, and stores the appropriate indicator of the monitor type 324, 328, 332, 336, 340, 344, 348.

Once the monitor type is determined and stored, the temperature is sensed at regular intervals 356. Based on the sensed temperature, the speed of sound, equivalent to the speed of the ultrasonic signal used by the system, may be calculated based on known formulas for determining the speed of sound at a given temperature, or alternatively, by accessing stored scale values for the speed of sound based on a variety of temperatures 360.

While the transmitting function of the transducer is disabled and while the receiving function of the transducer is enabled, the received signal is read 364. Various delays are used to reduce the number of erroneous readings processed by the system. If no readings are received after 12 milliseconds 368, a counter indicating the bad readings (nogood counter) is incremented 372. If no readings are obtained after 20 attempts 376, the last reading of the velocity signal is set at zero and the process is repeated 384, 388. Otherwise, the prior signal is continued to be stored and the sensing procedure is repeated 380.

If a signal is received within the 12 millisecond period 368, all counters are cleared 390 to avoid erroneous signals which may occur at the beginning of a received signal input. A 64 cycle period is then counted 392. However, if the period during which the cycle is counted exceeds 13 milliseconds 394, the system defaults to determining whether there are any good readings at step 408, since in no event will the 64 cycle period exceed 13 milliseconds. If the system does count 64 cycles at step 392, the frequency of the received signal is then checked to determine whether it is within the limits for an expected velocity of the vehicle 400. If not, the 64 cycle count is repeated 401. If the received frequency is within normal ranges, the reading is saved 402. Up to 12 readings are saved 404, 406. Up to twelve readings are used to improve the accuracy of the system. If good readings are not obtained, the nogood counter is incremented 412 as described above.

After the repeated readings of the receiving signal, the reading closest to the stored average received signal reading is stored at newcnt 416. The nogood counter is cleared 420. After waiting a period of time calculated based on prior readings, the signal is again transmitted 424.

The newcnt reading is then compared to the prior frequency reading to determine whether the difference in the readings indicates an acceleration or deceleration greater than 5 miles per hour per second 428, 432. If such a large change in speed is monitored, that indicates a potentially erroneous reading. The new reading will then be limited in its difference from the prior reading so that the acceleration or deceleration does not exceed 5 miles per hour per second 436.

The newcnt reading is then averaged with prior received signal readings, with the divisor for the averaging process varied according to the velocity measured 440, 444, 448, 452, 456, 460.

The averaged received signal frequency, which is stored in the form of a signal period at AVERCV 464, is then used to calculate the vehicle's speed in accordance with the previously-described equation, also indicated at 468.

The system will set a flag if the velocity of the vehicle is less than zero 480, 484. If the velocity indicated is negative, the reverse flag is set and the 37°/63° duty cycle output signal is inverted. Thus, reverse direction may be sensed at the output. Although present monitoring systems are not known to be capable of detecting an indication of reverse velocity, because such an indication improves the accuracy of a monitoring system, it is advantageous to have the sensing system capable of providing such a negative velocity signal should monitoring systems be developed which are capable of incorporating such data.

If the speed sensed is less than 0.25 mph, the output is set at zero. The output is then converted into a frequency signal readable by the monitoring system 496. Other embodiments of the invention may be readily ascertainable to those skilled in the field. The disclosure does not exclude such alternative embodiments from the scope of the invention.

What is claimed is:

1. A container for a velocity sensor which is adapted to be mounted on an agricultural vehicle comprising:
   (a) a housing having a plurality of linear mounting channels defined therein, said channels being adapted for slidably receiving a mounting projection or projections secured to an agricultural vehicle said linear mounting channels being positioned such that they are aligned with the direction of travel of the vehicle when said housing is mounted to the vehicle; and
   (b) a transducer for transmitting and receiving pulses, said transducer mounted in said housing and directed such that signal is transmitted by said transducer at a predetermined angle with the line of travel of the vehicle when said housing is secured to the vehicle by the linear mounting channels.

2. The container of claim 1, wherein the predetermined angle of said transducer is approximately 37 degrees.

3. The container of claim 1 further comprising at least one end plate for enclosing said housing and sealant means applied to the periphery of the housing and the end plate where the housing and end plate are drawn together for forming a seal between the housing and end plate, said sealant means forming at least one leak hole in its periphery having no sealant means, said leak hole located at the edge of the housing which is the lower edge when the housing is mounted to a vehicle, such that moisture which is enclosed by the sealed housing means when the housing is mounted on a vehicle may drain through the leak hole formed by the sealant means out of the housing.

4. A container for a sensor for an agricultural vehicle having a housing containing velocity sensor circuitry, the housing having linear mounting channels formed on the top, bottom, left side, and right side of the housing and aligned parallel to the direction of travel of the vehicle when the housing forming said mounting channels is mounted to said agricultural vehicle, said mounting channels formed such that a mounting projection or projections secured to the vehicle may be slidably received in the channels for mounting the housing on the agricultural vehicle.

5. A container of claim 4 further comprising at least one end plate for enclosing said housing and sealant means applied to the periphery of the housing and the end plate where the housing and end plate are drawn together for forming a seal between the housing and end plate, said sealant means forming at least one leak hole in its periphery having no sealant means, said leak hole located at the edge of the housing which is the lower edge when the housing is mounted to a vehicle, such that moisture which is enclosed by the sealed housing means when the housing is mounted on a vehicle may drain through the leak hole formed by the sealant means out of the housing.

6. A container for a velocity sensor for sensing the velocity of a vehicle mounted to the sensor comprising:
   (a) a housing means for housing the velocity sensor;
   (b) at least one end plate for enclosing said housing; and
   (c) sealant means applied to the periphery of the housing and the end plate where the housing and end plate are drawn together for forming a seal between the ho using and end plate, said sealant means forming at least one leak hole in its periphery having no sealant means, said leak hole located at the edge of the housing which is the lower edge when the housing is mounted to a vehicle, such that moisture which is enclosed by the sealed housing means when the housing is mounted on a vehicle may drain through the leak hole formed by the sealant means out of the housing.

* * * * *